Figure 1:
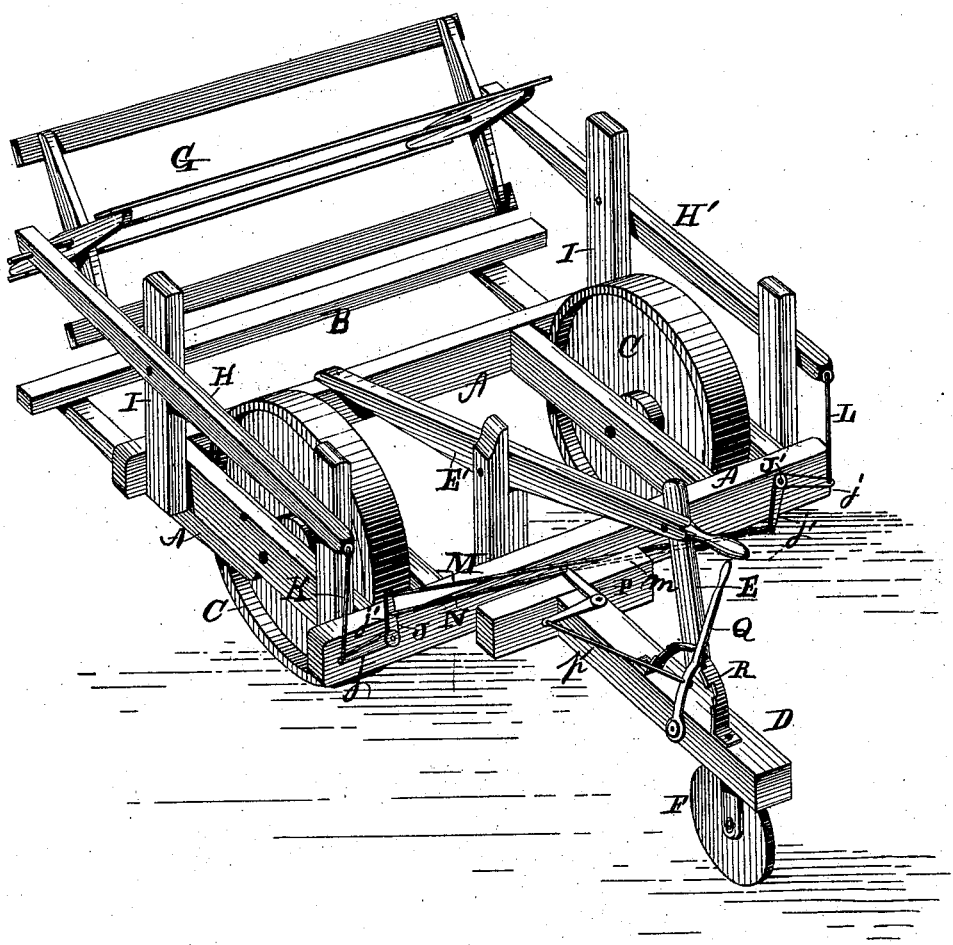

A. J. HODGES & J. B. MOHLER.
Harvester-Reel.

No. 209,047.  Patented Oct. 15, 1878.

UNITED STATES PATENT OFFICE.

ANDREW J. HODGES, OF PEORIA, AND JAMES B. MOHLER, OF PEKIN, ILLINOIS; SAID MOHLER ASSIGNOR TO SAID HODGES.

IMPROVEMENT IN HARVESTER-REELS.

Specification forming part of Letters Patent No. 209,047, dated October 15, 1878; application filed October 16, 1877.

*To all whom it may concern:*

Be it known that we, ANDREW J. HODGES, of Peoria, in the county of Peoria and State of Illinois, and JAMES B. MOHLER, of Pekin, Tazewell county, and State of Illinois, have invented certain new and useful Improvements in Harvester-Reel Adjustments; and we do hereby declare that the following is a full, clear, and exact description thereof, which will enable others skilled in the art to which it appertains to make and use the same, reference being had to the accompanying drawings, and to letters of reference marked thereon, which form a part of this specification.

The object of this invention is to provide means of adjusting the reel relatively to the sickle of that class of harvesters known as "headers;" and the invention consists in the use of elbow-levers pivoted on the main frame of the machine, and connected with the adjustable reel-carrier arms, in such manner that they may be used to oscillate the carrier-arms to raise and lower the reel, and also connected with a third elbow-lever, by means of which they may be operated simultaneously; and it further consists in the combination of a segmental rack-bar and lever with the three aforesaid elbow-levers and with the reel-carrier and reel, for the purpose of operating and for securing the parts in working position, as hereinafter fully described, and set forth in the claims hereto annexed.

The accompanying drawing is a perspective view of a machine embodying our invention.

Referring to the parts by letters, letter A represents the main frame; B, the platform-frame, and C the wheels of an ordinary grain-heading machine, with a thrust-bar or draft-pole, D, and bars E E' for adjusting the height of cut of the sickle, which is carried on the outer and front part of the frame B. F is the guide-wheel. G is a reel, the shaft of which is journaled in the ends of arms or levers H H', which are pivoted at their mid-lengths to standards I I. The reel G may be rotated by any suitable device.

The foregoing-named parts do not require any further description, as they are not claimed as new by us, and constitute the main parts of an ordinary heading-machine.

J J' are elbow-levers, pivoted at their angles, one at each side, and upon the rear end of the frame A. The outer arm, j', of the lever J is connected by a rod, K, with the end of the lever H, and the outer arm, j', of J' is connected by a rod, L, with the lever H'. M is a rod connecting the arms j' of the levers J J'.

The levers J J' are so arranged and their arms so connected by the rod M that longitudinal movement of said rod M will vibrate the elbow-levers J J' in opposite directions, and thus raise and lower the ends of the reel-carrier arms H H' simultaneously by a reciprocating movement of the rod M, and raise and lower the reel G and adjust its distance from the sickle.

N is a rod connecting the arm j' of lever J with one arm of an elbow-lever, P, which is pivoted on the pole D, and its other end connected by a rod, p, with a hand-lever, Q, which is pivoted to the side of pole D, and adjustable at different angles by means of a segment rack-bar, R. The dotted line m illustrates a modification, showing the rod M connected to the same arm of the elbow-lever P as is the rod N, and thereby transmitting motion to the elbow-lever J' at the same time and in the same direction as is done by the rod M.

The drawing illustrates the operation of elevating the reel G by throwing the lever Q forward, and it will be obvious that the procedure for lowering the reel is by turning the lever Q backward.

Having thus described our invention, what we claim as new, and desire to secure by Letters Patent, is—

1. The combination of reel G and pivoted reel-carriers H H' with standards I, vertical rods L K, vertically-operating elbow-levers J J', connecting-rod M, horizontally-operating elbow-lever P, link-rods N p, adjusting-lever Q, and locking-segment R, said parts being so arranged that when said lever is rocked in either direction said elbow-levers J J' are turned on their pivots in opposite directions, substantially as set forth.

2. The combination of reel G and pivoted reel-carriers H H', with standards I, vertical rods L K, vertically-operating elbow-levers J J', arranged in relatively reverse positions, rod M, connecting the upper arm of lever J with the lower arm of lever J', horizontally-operating elbow-lever P, rod N, connecting the rear arm of lever P to the upper arm of lever J, operating-lever Q, rack R, and link-rod p, substantially as set forth.

In testimony that we claim the foregoing as our own we affix our signatures in presence of two witnesses.

ANDREW J. HODGES.
JAMES B. MOHLER.

Witnesses:
O. LESTER,
H. P. WILBER.